US012075552B2

(12) United States Patent
Suslov et al.

(10) Patent No.: US 12,075,552 B2
(45) **Date of Patent: *Aug. 27, 2024**

(54) PLASMA-GENERATING DEVICE, PLASMA SURGICAL DEVICE AND USE OF A PLASMA SURGICAL DEVICE

(71) Applicant: Plasma Surgical, Inc., Roswell, GA (US)

(72) Inventors: Nikolay Suslov, Vastra Frolonda (SE); Igor Rubiner, Billdal (SE)

(73) Assignee: Plasma Surgical, Inc., Roswell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,805

(22) Filed: Dec. 20, 2018

(65) Prior Publication Data

US 2019/0320522 A1 Oct. 17, 2019

Related U.S. Application Data

(63) Continuation of application No. 15/875,291, filed on Jan. 19, 2018, now Pat. No. 10,201,067, which is a
(Continued)

(30) Foreign Application Priority Data

Jul. 8, 2005 (SE) .................................... 0501603-5

(51) Int. Cl.
*H05H 1/28* (2006.01)
*H05H 1/34* (2006.01)

(52) U.S. Cl.
CPC ................ *H05H 1/28* (2013.01); *H05H 1/34* (2013.01); *H05H 1/341* (2013.01); *H05H 1/3452* (2021.05); *H05H 1/3484* (2021.05)

(58) Field of Classification Search
CPC ............ H05H 1/28; H05H 1/341; H05H 1/34; H05H 2001/3452; H05H 2001/3484
(Continued)

(56) References Cited

U.S. PATENT DOCUMENTS 3,077,108 A 2/1963 Gage et al.
3,082,314 A 3/1963 Yoshiaki et al.
(Continued)

FOREIGN PATENT DOCUMENTS

AU 2000250426 6/2005
AU 2006252145 1/2007
(Continued)

OTHER PUBLICATIONS

501(k) Notification (21 CFR 807(e)) for the Plasma Surgical Ltd. PlasmaJet Neutral Plasma Surgery System, Section 10—Executive Summary—K080197.
(Continued)

*Primary Examiner* — Thien S Tran
(74) *Attorney, Agent, or Firm* — Cooley LLP

(57) ABSTRACT

The present invention relates to a plasma-generating device, comprising an anode, a cathode and at least one intermediate electrode, said intermediate electrode being arranged at least partly between said anode and said cathode, and said intermediate electrode and said anode forming at least a part of a plasma channel which has an opening in said anode. Further, the plasma-generating device comprises at least one coolant channel which is arranged with at least one outlet opening which is positioned beyond, in the direction from the cathode to the anode, said at least one intermediate electrode, and the channel direction of said coolant channel at said outlet opening has a directional component which is the same as that of the channel direction of the plasma channel at the opening thereof. The invention also concerns
(Continued)

a plasma surgical device and use of such a plasma surgical device.

25 Claims, 2 Drawing Sheets

Related U.S. Application Data continuation of application No. 11/482,580, filed on Jul. 7, 2006, now Pat. No. 9,913,358.

(58) Field of Classification Search
USPC ............ 219/121.39, 121.47, 121.48, 121.51, 219/121.52
See application file for complete search history.

(56) References Cited

U.S. PATENT DOCUMENTS

| | | | | |
|---|---|---|---|---|
| 3,100,487 | A | 8/1963 | Bagley | |
| 3,100,489 | A | 8/1963 | Bagley | |
| 3,145,287 | A | 8/1964 | Seibein et al. | |
| 3,153,133 | A | 10/1964 | Ducati | |
| 3,270,745 | A | 9/1966 | Wood | |
| 3,360,988 | A | 1/1968 | Stein et al. | |
| 3,413,509 | A | 11/1968 | Cann et al. | |
| 3,433,991 | A | 3/1969 | Whyman | |
| 3,434,476 | A * | 3/1969 | Shaw | A61B 18/042 606/22 |
| 3,534,388 | A * | 10/1970 | Osamu | B23K 10/00 219/121.51 |
| 3,628,079 | A | 12/1971 | Dobbs et al. | |
| 3,676,638 | A | 7/1972 | Stand | |
| 3,775,825 | A | 12/1973 | Wood et al. | |
| 3,803,380 | A | 4/1974 | Ragaller | |
| 3,838,242 | A | 9/1974 | Coucher | |
| 3,851,140 | A | 11/1974 | Coucher | |
| 3,866,089 | A | 2/1975 | Hengartner | |
| 3,903,891 | A * | 9/1975 | Brayshaw | A61B 18/042 606/27 |
| 3,914,573 | A | 10/1975 | Muehlberger | |
| 3,938,525 | A | 2/1976 | Coucher | |
| 3,991,764 | A | 11/1976 | Incropera et al. | |
| 3,995,138 | A | 11/1976 | Kalev et al. | |
| 4,029,930 | A | 6/1977 | Sagara et al. | |
| 4,041,952 | A | 6/1977 | Morrison, Jr. et al. | |
| 4,035,684 | A | 7/1977 | Svoboda et al. | |
| 4,201,314 | A | 5/1980 | Samuels et al. | |
| 4,256,779 | A | 3/1981 | Sokol et al. | |
| 4,317,981 | A | 3/1982 | Fridlyand | |
| 4,317,984 | A | 3/1982 | Fridlyand | |
| 4,397,312 | A | 8/1983 | Molko | |
| 4,445,021 | A | 4/1984 | Irons et al. | |
| 4,620,080 | A | 10/1986 | Arata et al. | |
| 4,661,682 | A | 4/1987 | Gruner et al. | |
| 4,672,163 | A | 6/1987 | Matsui et al. | |
| 4,674,683 | A | 6/1987 | Fabel | |
| 4,682,598 | A | 7/1987 | Beraha | |
| 4,696,855 | A | 9/1987 | Pettit, Jr. et al. | |
| 4,711,627 | A | 12/1987 | Oeschsle et al. | |
| 4,713,170 | A | 12/1987 | Saibic | |
| 4,743,734 | A | 5/1988 | Garlanov et al. | |
| 4,764,656 | A | 8/1988 | Browning | |
| 4,777,949 | A | 10/1988 | Perlin | |
| 4,780,591 | A | 10/1988 | Bernecki et al. | |
| 4,781,175 | A | 11/1988 | McGreevy et al. | |
| 4,784,321 | A | 11/1988 | Delaplace | |
| 4,785,220 | A | 11/1988 | Brown et al. | |
| 4,839,492 | A | 6/1989 | Bouchier et al. | |
| 4,841,114 | A | 6/1989 | Browning | |
| 4,835,515 | A | 8/1989 | Willen et al. | |
| 4,853,515 | A | 8/1989 | Willen et al. | |
| 4,855,563 | A | 8/1989 | Beresnev et al. | |
| 4,866,240 | A | 9/1989 | Webber | |
| 4,869,936 | A | 9/1989 | Moskowitz et al. | |
| 4,874,988 | A | 10/1989 | English | |
| 4,877,937 | A | 10/1989 | Muller | |
| 4,916,273 | A | 4/1990 | Browning | |
| 4,924,059 | A | 5/1990 | Rotolico et al. | |
| 5,008,511 | A | 4/1991 | Ross | |
| 5,013,883 | A | 5/1991 | Fuimerfreddo et al. | |
| 5,100,402 | A | 3/1992 | Fan | |
| 5,144,110 | A | 9/1992 | Marantz et al. | |
| 5,151,102 | A | 9/1992 | Kamiyama et al. | |
| 5,201,900 | A | 4/1993 | Nardella | |
| 5,207,691 | A | 5/1993 | Nardella | |
| 5,211,646 | A | 5/1993 | Alperovich et al. | |
| 5,216,221 | A | 6/1993 | Carkhuff | |
| 5,217,460 | A | 6/1993 | Knoepfler | |
| 5,225,652 | A | 6/1993 | Landes | |
| 5,227,603 | A | 7/1993 | Doolette et al. | |
| 5,261,905 | A | 11/1993 | Doresey | |
| 5,285,967 | A | 2/1994 | Weidman | |
| 5,332,885 | A | 7/1994 | Landes | |
| 5,352,219 | A | 10/1994 | Reddy | |
| 5,396,882 | A | 3/1995 | Zapol | |
| 5,403,312 | A | 4/1995 | Yates et al. | |
| 5,406,046 | A | 4/1995 | Landes | |
| 5,408,066 | A | 4/1995 | Trapani et al. | |
| 5,412,173 | A | 5/1995 | Muelberger | |
| 5,445,638 | A | 8/1995 | Rydell et al. | |
| 5,452,854 | A | 9/1995 | Keller | |
| 5,460,629 | A | 10/1995 | Shlain et al. | |
| 5,485,721 | A | 1/1996 | Steenborg | |
| 5,514,848 | A | 5/1996 | Ross et al. | |
| 5,519,183 | A | 5/1996 | Mueller | |
| 5,527,313 | A | 6/1996 | Scott et al. | |
| 5,573,682 | A | 11/1996 | Beason, Jr. | |
| 5,582,611 | A | 12/1996 | Tsuruta et al. | |
| 5,620,616 | A | 4/1997 | Anderson et al. | |
| 5,629,585 | A | 5/1997 | Altmann | |
| 5,637,242 | A | 6/1997 | Muehlberger | |
| 5,640,843 | A | 6/1997 | Aston | |
| 5,662,680 | A | 9/1997 | Desai | |
| 5,665,085 | A | 9/1997 | Nardella | |
| 5,679,167 | A | 10/1997 | Muehlberger | |
| 5,680,014 | A | 10/1997 | Miyamoto et al. | |
| 5,688,270 | A | 11/1997 | Yates et al. | |
| 5,697,281 | A | 12/1997 | Eggers et al. | |
| 5,697,882 | A * | 12/1997 | Eggers | A61B 18/12 604/114 |
| 5,702,390 | A | 12/1997 | Austin et al. | |
| 5,720,745 | A | 2/1998 | Farin et al. | |
| 5,733,662 | A | 3/1998 | Bogachek | |
| 5,797,941 | A | 8/1998 | Schulze et al. | |
| 5,827,271 | A | 10/1998 | Buysse et al. | |
| 5,833,690 | A | 11/1998 | Yates et al. | |
| 5,837,959 | A | 11/1998 | Sahoo et al. | |
| 5,843,079 | A | 12/1998 | Suslov | |
| 5,858,469 | A | 1/1999 | Bernecki et al. | |
| 5,858,470 | A | 1/1999 | Muller | |
| 5,897,059 | A | 4/1999 | Belashchenko et al. | |
| 5,906,757 | A | 5/1999 | Kong et al. | |
| 5,932,293 | A | 8/1999 | Sedov | |
| 6,003,788 | A | 12/1999 | Rusch | |
| 6,042,019 | A | 3/2000 | Delcea | |
| 6,099,523 | A | 8/2000 | Kim et al. | |
| 6,135,998 | A | 10/2000 | Palanker | |
| 6,137,078 | A | 10/2000 | Keller | |
| 6,137,231 | A | 10/2000 | Anders | |
| 6,114,649 | A | 11/2000 | Delcea | |
| 6,162,220 | A | 12/2000 | Nezhat | |
| 6,169,370 | B1 | 1/2001 | Platzer | |
| 6,181,053 | B1 | 1/2001 | Roberts | |
| 6,202,939 | B1 | 3/2001 | Delcea | |
| 6,273,789 | B1 | 8/2001 | Lasalle et al. | |
| 6,283,386 | B1 | 9/2001 | Van Steenkiste et al. | |
| 6,352,533 | B1 | 3/2002 | Ellman et al. | |
| 6,386,140 | B1 | 5/2002 | Muller et al. | |
| 6,392,189 | B1 | 5/2002 | Delcea | |
| 6,443,948 | B1 | 9/2002 | Suslov et al. | |
| 6,475,212 | B2 | 11/2002 | Tanrisever | |
| 6,475,215 | B1 * | 11/2002 | Tanrisever | A61B 18/042 606/32 |

(56) References Cited

U.S. PATENT DOCUMENTS

| | | | |
|---|---|---|---|
| 6,514,252 | B2 | 2/2003 | Nezhat et al. |
| 6,515,252 | B1 | 2/2003 | Girold |
| 6,528,947 | B1 | 3/2003 | Chen et al. |
| 6,548,817 | B1 | 4/2003 | Anders |
| 6,562,037 | B2 | 5/2003 | Paton et al. |
| 6,629,974 | B2 | 10/2003 | Penny et al. |
| 6,657,152 | B2 | 12/2003 | Shimazu |
| 6,669,106 | B2 | 12/2003 | Delcea |
| 6,676,655 | B2 | 1/2004 | McDaniel et al. |
| 6,780,184 | B2 | 8/2004 | Tanrisever |
| 6,833,690 | B2 | 12/2004 | Walters et al. |
| 6,845,929 | B2 | 1/2005 | Dolatabadi et al. |
| 6,886,757 | B2 | 5/2005 | Byrnes et al. |
| 6,958,063 | B1 | 10/2005 | Soll et al. |
| 6,972,138 | B2 | 12/2005 | Heinrich et al. |
| 6,986,471 | B1 | 1/2006 | Kowalsky et al. |
| 7,025,764 | B2 | 4/2006 | Paton et al. |
| 7,030,336 | B1 | 4/2006 | Hawley |
| 7,118,570 | B2 | 10/2006 | Tetzlaff et al. |
| 7,291,804 | B2 | 11/2007 | Suslov |
| 7,589,473 | B2 | 9/2009 | Suslov |
| 8,030,849 | B2 | 10/2011 | Suslov |
| 8,613,742 | B2 | 12/2013 | Suslov |
| 9,089,319 | B2 | 7/2015 | Suslov |
| 9,913,358 | B2 | 3/2018 | Suslov et al. |
| 10,201,067 | B2 | 2/2019 | Suslov et al. |
| 2001/0041227 | A1 | 11/2001 | Hislop |
| 2002/0013583 | A1 | 1/2002 | Camran et al. |
| 2002/0071906 | A1 | 6/2002 | Rusch |
| 2002/0091385 | A1 | 7/2002 | Paton et al. |
| 2002/0097767 | A1 | 7/2002 | Krasnov |
| 2003/0030014 | A1 | 2/2003 | Wieland et al. |
| 2003/0040744 | A1 | 2/2003 | Latterell et al. |
| 2003/0064139 | A1 | 4/2003 | Chung et al. |
| 2003/0075618 | A1 | 4/2003 | Shimazu |
| 2003/0114845 | A1 | 6/2003 | Paton et al. |
| 2003/0125728 | A1 | 7/2003 | Nezhat et al. |
| 2003/0178511 | A1 | 9/2003 | Dolatabadi et al. |
| 2003/0190414 | A1 | 10/2003 | Van Steenkiste |
| 2004/0018317 | A1 | 1/2004 | Heinrich et al. |
| 2004/0068304 | A1 | 4/2004 | Paton et al. |
| 2004/0116918 | A1 | 6/2004 | Konesky |
| 2004/0124256 | A1 | 7/2004 | Itsukaichi et al. |
| 2004/0129222 | A1 | 7/2004 | Nylen et al. |
| 2004/0195219 | A1 | 10/2004 | Conway |
| 2005/0082395 | A1 | 4/2005 | Gardega |
| 2005/0120957 | A1 | 6/2005 | Kowalsky et al. |
| 2005/0192610 | A1 | 9/2005 | Houser et al. |
| 2005/0192611 | A1 | 9/2005 | Houser |
| 2005/0192612 | A1 | 9/2005 | Houser et al. |
| 2005/0234447 | A1 | 10/2005 | Paton et al. |
| 2005/0255419 | A1 | 11/2005 | Belashchenko et al. |
| 2006/0004354 | A1 | 1/2006 | Suslov |
| 2006/0037533 | A1 | 2/2006 | Belashchenko et al. |
| 2006/0049149 | A1 | 3/2006 | Shimazu |
| 2006/0090699 | A1 | 5/2006 | Muller |
| 2006/0091116 | A1 | 5/2006 | Suslov |
| 2006/0091117 | A1 | 5/2006 | Blankenship et al. |
| 2006/0091119 | A1 | 5/2006 | Zajchowski et al. |
| 2006/0108332 | A1 | 5/2006 | Belashchenko |
| 2006/0189976 | A1 | 8/2006 | Karni et al. |
| 2006/0217706 | A1 | 9/2006 | Lau et al. |
| 2006/0287651 | A1 | 12/2006 | Bayat |
| 2007/0021747 | A1 | 1/2007 | Suslov |
| 2007/0021748 | A1 | 1/2007 | Suslov |
| 2007/0038214 | A1 | 2/2007 | Morley et al. |
| 2007/0138147 | A1 | 6/2007 | Molz et al. |
| 2007/0173871 | A1 | 7/2007 | Houser et al. |
| 2007/0173872 | A1 | 7/2007 | Neuenfeldt |
| 2007/0191828 | A1 | 8/2007 | Houser et al. |
| 2008/0015566 | A1 | 1/2008 | Livneh |
| 2008/0071206 | A1 | 3/2008 | Peters |
| 2008/0114352 | A1 | 5/2008 | Long et al. |
| 2008/0185366 | A1 | 8/2008 | Suslov |
| 2008/0246385 | A1 | 10/2008 | Schamiloglu et al. |
| 2009/0039789 | A1 | 2/2009 | Suslov |
| 2009/0039790 | A1 | 2/2009 | Suslov |

FOREIGN PATENT DOCUMENTS

| | | | | |
|---|---|---|---|---|
| CA | 983586 | | 2/1979 | |
| CA | 1144 104 | | 4/1983 | |
| CA | 1237485 | | 5/1988 | |
| CA | 1308722 | | 10/1992 | |
| CA | 2594515 | | 7/2006 | |
| CN | 85107499 | | 4/1987 | |
| CN | 85107499 | A | 4/1987 | |
| CN | 1331836 | A | 1/2002 | |
| CN | 1557731 | | 12/2004 | |
| CN | 1682578 | | 10/2005 | |
| DE | 2033072 | | 2/1971 | |
| DE | 10129261 | | 9/1993 | |
| DE | 4209005 | | 12/2002 | |
| DE | 10127261 | A1 | 12/2002 | |
| EP | 0190359 | | 6/1986 | |
| EP | 0411170 | | 2/1991 | |
| EP | 0748149 | | 12/1996 | |
| EP | 0851040 | | 7/1998 | |
| EP | 1293169 | | 3/2003 | |
| EP | 1570798 | | 9/2005 | |
| ES | 2026344 | | 4/1992 | |
| FR | 2 193 299 | | 2/1974 | |
| FR | 2 567 747 | | 1/1986 | |
| GB | 751 735 | | 7/1956 | |
| GB | 921 016 | | 3/1963 | |
| GB | 1 125 806 | | 9/1968 | |
| GB | 1 176 333 | | 1/1970 | |
| GB | 1 268 843 | | 3/1972 | |
| GB | 2 407 050 | | 4/2005 | |
| JP | S479252 | A | 3/1972 | |
| JP | S52117255 | A | 10/1977 | |
| JP | S54120545 | U | 8/1979 | |
| JP | 57001580 | | 1/1982 | |
| JP | 57068269 | | 4/1982 | |
| JP | S6113600 | A | 1/1986 | |
| JP | A-S61-193783 | | 8/1986 | |
| JP | A-S61-286075 | | 12/1986 | |
| JP | 62123004 | | 6/1987 | |
| JP | S6415675 | U | 1/1989 | |
| JP | 1198539 | | 8/1989 | |
| JP | 1-319297 | | 12/1989 | |
| JP | 3043678 | | 2/1991 | |
| JP | 06262367 | | 9/1994 | |
| JP | 9299380 | | 11/1997 | |
| JP | 10024050 | | 1/1998 | |
| JP | 10234744 | | 9/1998 | |
| JP | 10504751 | | 12/1998 | |
| JP | 2002541902 | | 12/2002 | |
| JP | 2005539143 | A | 12/2005 | |
| JP | 2008036001 | | 2/2008 | |
| JP | 2008-284580 | | 11/2008 | |
| JP | 7284951 | B2 | 6/2023 | |
| MX | PA04010281 | | 6/2005 | |
| RU | 2178684 | | 1/2002 | |
| RU | 2183480 | | 6/2002 | |
| RU | 2183946 | | 6/2002 | |
| WO | WO 92/19166 | | 11/1992 | |
| WO | WO 96/06572 | | 3/1996 | |
| WO | WO 1996/006572 | | 3/1996 | |
| WO | WO-9606572 | A1 * | 3/1996 | ........... A61B 18/042 |
| WO | WO 97/11647 | | 4/1997 | |
| WO | WO 00/034979 | | 6/2000 | |
| WO | WO 01/62169 | | 8/2001 | |
| WO | WO 02/30308 | | 4/2002 | |
| WO | WO 2003/028805 | | 4/2003 | |
| WO | WO 2004/028221 | | 4/2004 | |
| WO | WO 2004/030551 | | 4/2004 | |
| WO | WO 2004/105450 | | 12/2004 | |
| WO | WO-2005009595 | A1 | 2/2005 | |
| WO | WO 2005/099595 | | 10/2005 | |
| WO | WO 2006/012165 | | 2/2006 | |
| WO | WO 2007/003157 | | 1/2007 | |

(56) References Cited

FOREIGN PATENT DOCUMENTS

| | | |
|---|---|---|
| WO | WO 2007/006516 | 1/2007 |
| WO | WO 2007/006517 | 1/2007 |
| WO | WO 2007/040702 | 4/2007 |

OTHER PUBLICATIONS

510(k) Summary, dated Jun. 2, 2008.
510(k) Summary, dated Oct. 30, 2003.
Aptekman, "Spectroscopic analysis of the PlasmaJet argon plasma with 5mm-0.5 coag-cut handpieces," Document PSSRP-106—K080197.
Asawanonda et al., "308-nm excimer laser for the treatment of psoriasis; a dose-response study," Arach. Dermatol. 136:619-24, 2000.
Branson, M. D., "Preliminary experience with neutral plasma, a new coagulation technology, in plastic surgery," Fayetteville, NY, 2005.
Canadian Office Action dated Jun. 12, 2013 for Canadian Application No. 2,695,902.
Canadian Office Action dated Jun. 18, 2013 for Canadian Application No. 2,695,650.
Charpentier et al., "Multicentric medical registry on the use of the Plasma Surgical PlasmaJet System in thoracic surgery," Club Thorax, 2008.
Chen et al., "What do we know about long laminar plasma jets?" Pure Appl Chem 78(6):1253-1264, 2006.
Cheng et al., "Comparison of laminar and turbulent thermal plasma jet characteristics—a modeling study," Plasma Chem Plasma process 26:211-235, 2006.
Chinese Office Action dated Apr. 27, 2012 for Chinese Application No. 200780100858.3.
Chinese Office Action dated Aug. 29, 2012 for Chinese Application No. 200780100858.3.
Chinese Office Action dated Dec. 5, 2012 for Chinese Application No. 200780052471.5.
Chinese Office Action dated Jan. 31, 2011 for Chinese Application No. 200680030194.3.
Chinese Office Action dated Jun. 11, 2010 for Chinese Application No. 200680030225.5.
Chinese Office Action dated Mar. 9, 2011 for Chinese Application No. 200680030225.5.
Chinese Office Action dated May 25, 2012 for Chinese Application No. 200780052471.5.
Chinese Office Action dated May 25, 2012 for Chinese Application No. 200780100857.9.
Chinese Office Action dated May 30, 2013 for Chinese Application No. 200780100857.9.
Chinese Office Action dated Nov. 13, 2012 for Chinese Application No. 2012220800745680.
Chinese Office Action dated Nov. 28, 2011 for Chinese Application No. 200780100857.9.
Chinese Office Action dated Oct. 26, 2010 for Chinese Application No. 200680030216.6.
Chinese Office Action dated Oct. 29, 2011 for Chinese Application No. 2007801008583.
CoagSafe™ Neutral Plasma Coagulator Operator Manual, Part No. OMC-2100-1, Revision 1.1, dated Mar. 2003—Appendix 1 of K030819.
Coven et al., "PUVA-induced lymphocyte apoptosis: mechanism of action in psoriasis," Photodermatol. Photoimmunol. Photomed. 15:22-7, 1999.
Dabringhausen et al., "Determination of HID electrode falls in a model lamp: Pyrometric measurements," J. Phys. D. Appl. Phys. 35:1621-1630, 2002.
Davis, J. R. (Ed.), ASM Thermal Spray Society, Handbook of Thermal Spray Technology, 2004, U.S. 42-168.
Deb et al., "Histological quantification of the tissue damage used in vivo by neutral PlasmaJet coagulator," Nottingham University Hospitals, Queen's Medical Centre, Nottingham NG7 2UH—Poster.
Device drawings submitted pursuant to MPEP §724.
Electrosurgical Generators Force FX™ Electrosurgical Generators by ValleyLab—K080197.
ERBE APC 300 Argon Plasma Coagulation Unit for Endoscopic Applications, Brochure—Appendix 4 of K030819.
Feldman et al., "Efficacy of the 308-nm excimer laser for treatment of psoriasis: results of a multicenter study," J. Am Acad. Dermatol. 46:900-6, 2002.
Final Office Action dated Apr. 10, 2017 for U.S. Appl. No. 11/482,580.
Final Office Action dated Aug. 21, 2008 for U.S. Appl. No. 11/482,580.
Final Office Action dated Jun. 10, 2013 for U.S. Appl. No. 12/696,411.
Final Office Action dated Oct. 19, 2009 for U.S. Appl. No. 11/482,580.
Final Office Action dated Oct. 24, 2012 for U.S. Appl. No. 11/482,580.
Force Argon™ II System, Improved Precision and Control in Electrosurgery, by ValleyLab—K080197.
Gerber et al., "Ultraviolet B 308-nm excimer laser treatment of psoriasis: a new phototherapeutic approach," Br. J. Dermatol. 149:1250-8, 2003.
Gugenheim et al., "Open, multicentric, clinical evaluation of the technical efficacy, reliability, safety, and clinical tolerance of the plasma surgical plasmaJet System for intra-operative coagulation in open and laparascopic general surgery," Department of Digestive Surgery, University Hospital, Nice, France, 2006.
Haemmerich et al., "Hepatic radiofrequency ablation with internally cooled probes: effect of coolant temperature on lesion size," IEEE Transactions of Biomedical Engineering 50(4):493-500, 2003.
Haines et al., "Argon neutral plasma energy for laparascopy and pen surgery recommended power settings and applications," Royal Surrey County Hospital, Guildford, Surrey, UK.
Honigsmann, "Phototherapy for psoriasis," Clin. Exp. Dermatol. 26:343-50, 2001.
Huang et al., "Laminar/turbulent plasma jets generated at reduced pressure," IEEE Transaction on Plasma Science 36(4):1052-1053, 2008.
Iannelli et al., "Neutral plasma coagulation (NPC)—A preliminary report on a new technique for post-bariatric corrective abdominoplasty," Department of Digestive Surgery, University Hospital, Nice, France, 2005.
International Preliminary Report on Patentability dated Feb. 9, 2010 for International Application No. PCT/EP2007/006939.
International Preliminary Report on Patentability dated Feb. 9, 2010 for International Application No. PCT/EP2007/006940.
International Search Report dated Apr. 14, 2011 for International Application No. PCT/EP2010/060641.
International Search Report dated Aug. 4, 2009 for International Application No. PCT/EP2007/000919.
International Search Report dated Feb. 14, 2007 for International Application No. PCT/EP2006/006688.
International Search Report dated Feb. 22, 2007 for International Application No. PCT/EP2006/006690.
International Search Report dated Feb. 7, 2007 for International Application No. PCT/EP2006/006689.
International Search Report dated May 26, 2008 for International Application No. PCT/EP2007/006939.
International Search Report dated Oct. 23, 2007 for International Application No. PCT/EP2007/000919.
International Search Report dated Sep. 27, 2010 for international Application No. PCT/EP2010/051130.
International-type Search Report dated Jan. 18, 2006 for Swedish Application No. 0501604-3.
International-type Search Report dated Jan. 18, 2006 for Swedish Application No. 0501602-7.
Japanese Office Action dated Apr. 3, 2012 for Japanese Application No. 2010-519339.
Japanese Office Action dated Feb. 15, 2012 for Japanese Application No. 2009-547536.
Japanese Office Action dated Jun. 10, 2011 for Japanese Application No. 2008-519873.
Japanese Office Action dated Mar. 13, 2012 for Japanese Application No. 2010-519340.

(56) References Cited

OTHER PUBLICATIONS

Letter to FDA re: 501(k) Notification (21 CFR 807.90(e)) for the PlasmaJet Neutral Plasma Surgery System, dated Jun. 2, 2008—K080197.
Lichtengerg et al., "Observation of different modes of cathodic arc attachment to H1D electrodes in a model lamp," J. Phys. D. appl. Phys. 35:1648-1656, 2002.
Marino, M. D., "A new option for patients facing liver resection surgery," Thomas Jefferson University Hospital.
McClurken et al., "Collagen shrinkage and vessel sealing," TissueLink Medical, Inc., Dover, NH; Technical Brief #300.
McClurken et al., "Histologic characteristics of the TissueLink Floating Ball device coagulation on porcine liver," TissueLink Medical, Inc., Dover, NH; Pre-Clinical Study #204.
Merloz, "Clinical evaluation of the Plasma Surgical PlasmaJet tissue sealing system in orthopedic surgery—early report," Orthopedic Surgery Department, University Hospital, Grenoble, France, 2007.
News Release and Video—2009, New Surgical Technology Offers Better Outcomes for Women's Reproductive Disorders: Stanford First in Bay Area to Offer PlasmaJet, Stanford Hospital and Clinics.
Nezhat et al., Use of neutral argon plasma in the laparoscopic treatment of endometriosis, Journal of the Society of Laparoendoscopic Surgeons, 2009.
Office Action dated Apr. 11, 2012 for U.S. Appl. No. 11/482,580.
Office Action dated Apr. 17, 2008 for U.S. Appl. No. 11/701,911.
Office Action dated Apr. 2, 2010 for U.S. Appl. No. 11/701,911.
Office Action dated Apr. 24, 2012 for U.S. Appl. No. 13/358,934.
Office Action dated Apr. 3, 2013 for U.S. Appl. No. 11/890,937.
Office Action dated Apr. 9, 2010 for U.S. Appl. No. 11/890,937.
Office Action dated Dec. 5, 2012 for U.S. Appl. No. 12/696,411.
Office Action dated Dec. 6, 2010 for U.S. Appl. No. 11/482,582.
Office Action dated Dec. 8, 2010 for U.S. Appl. No. 11/482,581.
Office Action dated Feb. 1, 2008 for U.S. Appl. No. 11/482,580.
Office Action dated Jul. 19, 2010 for U.S. Appl. No. 11/701,911.
Office Action dated Jul. 20, 2016 for U.S. Appl. No. 11/482,580.
Office Action dated Jul. 31, 2013 for U.S. Appl. No. 12/841,361.
Office Action dated Jun. 23, 2010 for U.S. Appl. No. 11/482,582.
Office Action dated Jun. 24, 2010 for U.S. Appl. No. 11/482,581.
Office Action dated Jun. 29, 2010 for European Application No. 07786583.0.
Office Action dated Mar. 13, 2009 for U.S. Appl. No. 11/701,911.
Office Action dated Mar. 19, 2009 for U.S. Appl. No. 11/482,580.
Office Action dated Mar. 29, 2012 for U.S. Appl. No. 13/357,895.
Office Action dated May 23, 2011 for U.S. Appl. No. 11/482,582.
Office Action dated Nov. 26, 2010 for U.S. Appl. No. 12/557,645.
Office Action dated Oct. 18, 2007 for U.S. Appl. No. 11/701,911.
Office Action dated Sep. 17, 2009 for U.S. Appl. No. 11/890,937.
Office Action dated Sep. 29, 2009 for U.S. Appl. No. 11/701,911.
Office Action dated Sep. 7, 2012 for U.S. Appl. No. 13/357,895.
Palanker et al., "Electrosurgery with cellular precision," IEEE Transactions of Biomedical Engineering 55(2):838-841, 2008.
Pan et al., "Characteristics of argon laminar DC Plasma Jet at atmospheric pressure," Plasma Chem and Plasma Proc 22(2):271-283, 2002.
Pan et al., "Generation of long, laminar plasma jets at atmospheric pressure and effects of low turbulence," Plasma Chem Plasma Process 21(1):23-35, 2001.
Plasma Surgery: A patient Safety Solution (Study Guide 002).
Plasma Surgical Headlines Article: Atlanta, Feb. 2, 2010—"New Facilities Open in UK and US.".
Plasma Surgical Headlines Article: Atlanta, Feb. 2, 2010—"PlasmaJet to be Featured in Live Case at Endometriosis 2010 in Milan, Italy.".
Plasma Surgical Headlines Article; Chicago, Sep. 18, 2008—"PlasmaJet Named Innovation of the Year by the Society of Laparoendoscopic Surgeons.".
PlasmaJet English Brochure.
PlasmaJet Neutral Plasma Coagulator Brochure mpb 2100—K080197.
PlasmaJet Neutral Plasma Coagulator Operator Manual, Part No. OMC-2100 (Revision 1.7, dated May 2004)—K030819.
PlasmaJet Operator Manual Part No. OMC-2130-EN (Revision 3.1/Draft) dated May 2008—K080197.
Premarket Notification 510(k) Submission, Plasma Surgical Ltd.—PlasmaJet™ (formerly CoagSafe™) Neutral Plasma coagulator, additional information provided in response to the e-mail request dated Jul. 14, 2004—K030819.
Premarket Notification 510(k) Submission, Plasma Surgical Ltd. CoagSafe™, Section 4 Device Description—K030819.
Premarket Notification 510(k) Submission, Plasma Surgical Ltd. CoagSafe™, Section 5 Substantial Equivalence—K030819.
Premarket Notification 510(k) Submission, Plasma Surgical Ltd. PlasmaJet™, Section 11 Device Description—K080197.
Report on the comparative analysis of morphological changes in tissue from different organs after using the PlasmaJet version 3 (including cutting handpieces), Aug. 2007—K080197.
Schmitz et al., "Analysis of the cathode region of atmospheric pressure discharges," J. Phys. D. Appl. Phys. 35:1727-1735, 2002.
Search Report dated Jan. 18, 2006 for Swedish Application No. 0501603-5.
Severtsev et al., "Comparison of different equipment for final haemostasis of the wound surface of the liver following resection," Dept. of Surgery, Postgraduate and Research Centre, Medical Centre of the Directorate of Presidential Affairs of the Russian Federation, Moscow, Russia—K-030819.
Severtsev et al., "Polycystic liver disease: slerotherapy, surgery and sealing of cysts with fibrin sealant," European Congress of the International Hepatobiliary Association, Hamburge, Germany, pp. 259-263, Jun. 8-12, 1997.
Sonoda et al., "Pathologic analysis of ex-vivo plasma energy tumor destruction in patients with ovarian or peritoneal cancer," Gynecology Service, Department of Surgery—Memorial Sloan-Kettering Cancer Center, New York, NY—Poster.
The Edge in Electrosurgery From Birtcher, Brochure—Appendix 4 of K030819.
The Valleylab Force GSU System, Brochure—Appendix 4 of K030819.
Treat, A New thermal device for sealing and dividing blood vessels, Dept. of Surgery, Columbia University, New York, NY.
Trehan et al., "Medium-dose 308-nm excimer laser for the treatment of psoriasis," J. Am. Acad. Dermatol. 47:701-8, 2002.
Video—Laparoscopic Management of Pelvic Endometriosis, by Ceana Nezhat, M.D.
Video—Tissue Coagulation, by Denis F. Branson, M.D.
Video—Tumor Destruction Using Plasma Surgery, by Douglas A. Levine, M.D.
White Paper—A Tissue Study using the plasmaJet for coagulation: A tissue study comparing the PlasmaJet with argon enhanced electrosurgery and fluid coupled electrosurgery.
White Paper—Plasma Technology and its Clinical Application: An introduction to Plasma Surgery and the PlasmaJet—a new surgical technology.
Written Opinion of the International Searching Authority dated Apr. 14, 2011 for International Application No. PCT/EP2010/060641.
Written Opinion of the International Searching Authority dated Aug. 4, 2009 for International Application No. PCT/EP2007/000919.
Written Opinion of the International Searching Authority dated Feb. 14, 2007 for International Application No. PCT/EP2006/006688.
Written Opinion of the International Searching Authority dated Feb. 22, 2007 for International Application No. PCT/EP2006/006689.
Written Opinion of the International Searching Authority dated Feb. 22, 2007 for International Application No. PCT/2006/006690.
Written Opinion of the International Searching Authority dated May 26, 2008 for International Application No. PCT/EP2007/006939.
Written Opinion of the International Searching Authority dated Oct. 27, 2007 for International Application No. PCT/EP2007/00919.
Written Opinion of the International Searching Authority dated Sep. 27, 2010 for International Application No. PCT/EP2010/051130.
www.plasmasurgical.com, as of Feb. 18, 2010.
Zenker, "Argon plasma coagulation," German Medical Science 3(1):1-5, 2008.

(56) References Cited

OTHER PUBLICATIONS

510(k) Notification (21 CFR 807.90(e)) for the Plasma Surgical Ltd. PlasmaJet® Neutral Plasma Surgery System, Section 10—Executive Summary, dated Jan. 25, 2008—K080197, 2 pages.
Canadian Office Action of Canadian application No. 2,614,375 dated Mar. 21, 2013, 3 pages.
Canadian Office Action of Canadian application No. 2,614,375 dated Sep. 12, 2013, 22 pages.
European Office Action of application No. 06762496.5, dated Jun. 17, 2014, 6 pages.
Notice of Allowance and Fees Due for U.S. Appl. No. 12/557,645, dated May 26, 2011, 5 pages.
Notice of Allowance and Fees Due for U.S. Appl. No. 12/696,411, dated Aug. 12, 2013, 4 pages.
Notice of Allowance and Fees Due for U.S. Appl. No. 13/357,895, dated Feb. 21, 2013, 9 pages.
Notice of Allowance and Fees Due of U.S. Appl. No. 11/482,581, filed Oct. 28, 2011, 10 pages.
Notice of Allowance and Fees Due of U.S. Appl. No. 11/482,582, filed Sep. 23, 2011, 10 pages.
Notice of Allowance and Fees Due of U.S. Appl. No. 13/358,934, dated Sept. 5, 2012, 22 pages.
Notice of Allowance dated May 15, 2009 for U.S. Appl. No. 11/890,938, 7 pages.
Notice of Allowance dated Sep. 21, 2018 for U.S. Appl. No. 15/875,291, 8 pages.
Notice of Allowance of U.S. Appl. No. 11/701,911, dated Dec. 6, 2010, 5 pages.
Office Action dated Mar. 27, 2018 for U.S. Appl. No. 15/875,291, 11 pages.
PCT International Search Report for PCT/EP2007/006940 dated Jul. 11, 2008, 5 pages.
PCT Invitation to Pay Additional Fees for PCT/EP2007/006940, dated May 20, 2008, 21 pages.
PCT Written Opinion for PCT/EP2007/006940, Feb. 6, 2010, 7 pages.
Supplemental Notice of Allowability of U.S. Appl. No. 11/482,582, filed Oct. 12, 2011, 4 pages.
Supplemental Notice of Allowability of U.S. Appl. No. 11/482,582, filed Oct. 25, 2011, 5 pages.
Treat, "A new thermal device for sealing and dividing blood vessels", Dept. of Surgery, Columbia University. New York, NY, 2 pages.
U.S. Appl. No. 12/841,361, filed Jul. 22, 2010, Suslov.
U.S. Appl. No. 12/557,645, Suslov, Sep. 11, 2009, 46 pages.
U.S. Appl. No. 12/696,411; Suslov, Jan. 29, 10.
Webster, Merriam, "Plainspoken, Plastic Surgery", The Merriam-Webster Dictionary, Merriam-Webster, Incorporated, Springfield, Massachusetts, Jul. 1, 2004, 5 pages.

* cited by examiner

PLASMA-GENERATING DEVICE, PLASMA SURGICAL DEVICE AND USE OF A PLASMA SURGICAL DEVICE

CLAIM OF PRIORITY

This application claims priority of a Swedish Patent Application No. 0501603-5 filed on Jul. 8, 2005.

FIELD OF THE INVENTION

The present invention relates to a plasma-generating device, comprising an anode, a cathode and at least one intermediate electrode, said intermediate electrode being arranged at least partly between said anode and said cathode, and said intermediate electrode and said anode forming at least a part of a plasma channel which has an opening in said anode. The invention also relates to a plasma surgical device and use of a plasma surgical device.

BACKGROUND ART

Plasma devices relate to the devices which are arranged to generate a gas plasma. Such gas plasma can be used, for instance, in surgery for the purpose of causing destruction (dissection) and/or coagulation of biological tissues.

As a rule, such plasma devices are formed with a long and narrow end or the like which can easily be applied to a desired area that is to be treated, such as bleeding tissue. At the tip of the device, a gas plasma is present, the high temperature of which allows treatment of the tissue adjacent to the tip.

WO 2004/030551 (Suslov) discloses a plasma surgical device according to prior art. This device comprises a plasma-generating system with an anode, a cathode and a gas supply channel for supplying gas to the plasma-generating system. Moreover the plasma-generating system comprises a plurality of electrodes which are arranged between said cathode and anode. A housing of an electrically conductive material which is connected to the anode encloses the plasma-generating system and forms the gas supply channel.

Owing to the recent developments in surgical technology, that referred to as laparoscopic (keyhole) surgery is being used more often. This implies, for example, a greater need for devices with small dimensions to allow accessibility without extensive surgery. Small instruments are also advantageous in surgical operations to achieve good accuracy.

It is also desirable to be able to improve the accuracy of the plasma jet in such a manner that, for example, smaller areas can be affected by heat. It is also desirable to be able to obtain a plasma-generating device which gives limited action of heat around the area which is to be treated.

Thus, there is a need for improved plasma devices, in particular plasma devices with small dimensions and great accuracy which can produce a high temperature plasma.

SUMMARY OF THE INVENTION

An object of the present invention is to provide an improved plasma-generating device according to the preamble to claim 1.

Additional objects of the present invention is to provide a plasma surgical device and use of such a plasma surgical device in the field of surgery.

According to one aspect of the invention, a plasma-generating device is provided, comprising an anode, a cathode and at least one intermediate electrode, said intermediate electrode being arranged at least partly between said anode and said cathode, and said intermediate electrode and said anode forming at least a part of a plasma channel which has an opening in said anode.

According to the invention, the plasma-generating device comprises at least one coolant channel which is arranged with at least one outlet opening which is positioned beyond, in the direction from the cathode to the anode, said at least one intermediate electrode, and the channel direction of said coolant channel at said outlet opening has a directional component which is the same as that of the channel direction of the plasma channel at the opening thereof.

This construction of the plasma-generating device allows that a coolant, which is adapted to flow in the coolant channel, is allowed to flow out at the end of the plasma-generating device in the vicinity of the opening of the plasma channel. An advantage achieved by this arrangement is that a coolant flowing out through an outlet of the coolant channel can be used to screen and restrict a plasma jet which is emitted through the plasma channel outlet which opens into the anode. Screening and restriction of the plasma jet allows, inter alia, advantages in treatment of above all small areas since the active propagations of the plasma-generating jet can be limited.

It is also possible to use the coolant flowing out to cool an object affected by the plasma jet. Cooling of the object that is to be treated can, for instance, be suitable to protect regions surrounding the area of treatment.

For instance, the plasma jet can be screened in its longitudinal direction so that there is substantially low heat on one side of the screen and substantially high heat on the other side of the screen. In this manner, a substantially distinct position of the plasma jet is obtained, in the flow direction of the plasma jet, where the object to be treated is affected, which can provide improved accuracy in operation of the plasma-generating device.

Similarly, the coolant flowing out can provide screening of the plasma jet in the radial direction relative to the flow direction of the plasma jet. Screening in the radial direction in this way allows that a relatively small surface can be affected by heat in treatment. Screening in the lateral direction, relative to the flow direction of the plasma, can also allow that areas around the treated region can at the same time be cooled by the coolant flowing out and thus be affected to a relatively small extent by the heat of the plasma jet.

Prior art plasma-generating devices usually have a closed coolant system for cooling the plasma-generating device in operation. Such a closed coolant system is often arranged by the coolant flowing in along one path in the plasma-generating device and returning along another path. This often causes relatively long flow paths. A drawback of long flow paths is that flow channels for the coolant must frequently be made relatively large to prevent extensive pressure drops. This means in turn that the flow channels occupy space that affects the outer dimensions of the plasma-generating device.

A further advantage of the invention is that pressure drops in the coolant channel can be reduced compared with, for instance, closed and circulating coolant systems. Consequently the cross-section of the coolant channel can be kept relatively small, which means that also the outer dimensions of the plasma-generating device can be reduced. Reduced dimensions of the plasma-generating device are often desirable in connection with, for instance, use in space-limited regions or in operation that requires great accuracy. Suitably the end of the plasma-generating device next to the anode ("the anode end of the device") has an outer dimension which is less than 10 mm, preferably less than 5 mm. In an alternative embodiment, the outer dimension of the plasma-generating device is equal to or less than 3 mm. The anode end of the device preferably has a circular outer geometry.

Thus, the invention allows that the coolant which is adapted to flow through the coolant channel can be used to cool the plasma-generating device in operation, screen and limit the propagation of the plasma jet and cool regions surrounding the area affected by the plasma jet. However, it will be appreciated that, dependent on the application, it is possible to use individual fields of application or a plurality of these fields of application.

To allow the coolant in the coolant channel to flow out in the vicinity of the plasma jet, it is advantageous to arrange the outlet opening of the coolant channel beside and spaced from the opening of the plasma channel.

In one embodiment, the opening of the coolant channel is arranged in the anode. By arranging the outlet opening of the coolant channel and the opening of the plasma channel close to each other, the end of the plasma-generating device has in the vicinity of the anode a nozzle with at least two outlets for discharging coolant and plasma, respectively. It is suitable to let the coolant channel extend along the whole anode, or parts of the anode, to allow also cooling of the anode in operation. In one embodiment, the outlet of the coolant channel is arranged on the same level as, or in front of, in the direction from the cathode to the anode, the outlet of the plasma channel in the anode.

The main extent of the coolant channel is suitably substantially parallel to said plasma channel. By arranging the coolant channel parallel to the plasma channel, it is possible to provide, for instance, a compact and narrow plasma-generating device. The coolant channel suitably consists of a throughflow channel whose main extent is arranged in the longitudinal direction of the plasma channel. With such a design, the coolant can, for instance, be supplied at one end of the plasma-generating device so as to flow out at the opposite end next to the anode.

Depending on desirable properties of the plasma-generating device, an outlet portion of the coolant channel can be directed and angled in different suitable ways. In one embodiment of the plasma-generating device, the channel direction of the coolant channel at the outlet opening can extend, in the direction from the cathode to the anode, at an angle between +30 and −30 degrees in relation to the channel direction of said plasma channel at the opening thereof. By choosing different angles for different plasma-generating devices, the plasma jet can thus be screened and restricted in various ways both in its longitudinal direction and transversely to its longitudinal direction. The above stated suitable variations of the channel direction of the coolant channel in relation to the channel direction of the plasma channel are such that an angle of 0 degrees corresponds to the fact that the channel directions of both channels are parallel.

In the case that a restriction is desired in the lateral direction, radially transversely to the longitudinal direction of the plasma channel, of the plasma jet, the channel direction of the coolant channel at said outlet opening can extend, in the direction from the cathode to the anode, substantially parallel to the channel direction of said plasma channel at the opening thereof.

In another embodiment, a smaller radial restriction transversely to the longitudinal direction of the plasma channel can be desirable. For an alternative embodiment, for instance, the channel direction of the coolant channel at said outlet opening can extend, in the direction from the cathode to the anode, at an angle away from the channel direction of said plasma channel at the opening thereof.

In another alternative embodiment, the channel direction of the coolant channel at said outlet opening can extend, in the direction from the cathode to the anode, at an angle towards the channel direction of said plasma channel at the opening thereof. This embodiment allows, for instance, that the plasma jet can be restricted, by the coolant flowing out, both in the lateral direction of the flow direction of the plasma jet and in the longitudinal direction of the flow direction of the plasma jet.

It will be appreciated that an outlet portion of the coolant channel can be arranged in various ways depending on the properties and performance that are desired in the plasma-generating device. It will also be appreciated that the plasma-generating device can be provided with a plurality of such outlet portions. A plurality of such outlet portions can be directed and angled in a similar manner. However, it is also possible to arrange a plurality of different outlet portions with different directions and angles relative to the channel direction of the plasma channel at the opening thereof.

The plasma-generating device can also be provided with one or more coolant channels. Moreover each such coolant channel can be provided with one or more outlet portions.

In use, the coolant channel is preferably passed by a coolant which flows from the cathode to the anode. As coolant, use is preferably made of water, although other types of fluids are possible. Use of a suitable coolant allows that heat emitted from the plasma-generating device in operation can be absorbed and extracted.

To provide efficient cooling of the plasma-generating device, it may be advantageous that a part of said coolant channel extends along said at least one intermediate electrode. By the coolant in the coolant channel being allowed to flow in direct contact with the intermediate electrode, good heat transfer between the intermediate electrode and the coolant is thus achieved. For suitable cooling of large parts of the intermediate electrode, a part of said coolant channel can extend along the outer periphery of said at least one intermediate electrode. For example, the coolant channel surrounds the outer periphery of said at least one intermediate electrode.

In one embodiment, an end sleeve of the plasma-generating device, which end sleeve preferably is connected to the anode, constitutes part of a radially outwardly positioned boundary surface of the coolant channel. In another alternative embodiment, said at least one intermediate electrode constitutes part of a radially inwardly positioned boundary surface of the coolant channel. By using these parts of the structure of the plasma-generating device as a part of the boundary surfaces of the coolant channel, good heat transfer can be obtained between the coolant and adjoining parts that are heated in operation. Moreover the dimensions of the plasma-generating device can be reduced by the use of separate coolant channel portions being reduced.

It is advantageous to arrange the coolant channel so that, in use, it is passed by a coolant quantity of between 1 and 5 ml/s. Such flow rates are especially advantageous in surgical applications where higher flow rates can be detrimental to the patient.

To allow the coolant to be distributed around the plasma jet, it may be advantageous that at least one coolant channel is provided with at least two outlets, preferably at least four outlets. Moreover the plasma-generating device can suitably be provided with a plurality of coolant channels. The number of coolant channels and the number of outlets can be optionally varied, depending on the field of application and the desired properties of the plasma-generating device.

According to a second aspect of the invention, a plasma surgical device is provided, comprising a plasma-generating device as described above. Such a plasma surgical device of the type here described can suitably be used for destruction or coagulation of biological tissue. Moreover, such a plasma surgical device can advantageously be used in heart or brain surgery. Alternatively such a plasma surgical device can advantageously be used in liver, spleen, kidney surgery or in skin treatment in plastic and cosmetic surgery.

BRIEF DESCRIPTION OF THE DRAWINGS

The invention will now be described in more detail with reference to the accompanying schematic drawings which by way of example illustrate currently preferred embodiments of the invention.

DESCRIPTION OF PREFERRED EMBODIMENTS

Figure 1A:
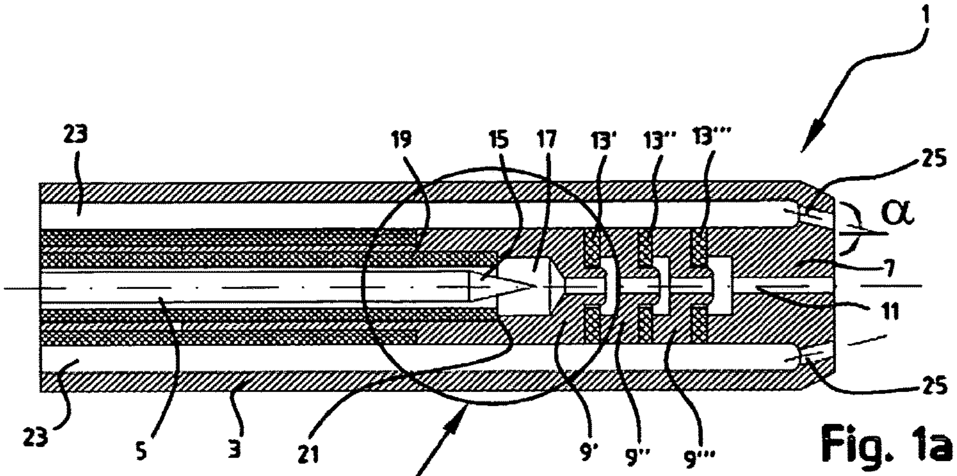
FIG. 1*a* is a cross-sectional view of an embodiment of a plasma-generating device according to the invention.

FIG. 1*a* shows in cross-section an embodiment of a plasma-generating device 1 according to the invention. The cross-section in FIG. 1*a* is taken through the centre of the plasma-generating device 1 in its longitudinal direction. The device comprises an elongate end sleeve 3 which accommodates a plasma-generating system for generating plasma which is discharged at the end of the end sleeve 3. The generated plasma can be used, for instance, to stop bleedings in tissues, vaporise tissues, cut tissues etc.

The plasma-generating device 1 according to FIG. 1*a* comprises a cathode 5, an anode 7 and a number of electrodes 9', 9'', 9''' arranged between the anode and the cathode, in this text referred to as intermediate electrodes. The intermediate electrodes 9', 9'', 9''' are annular and form part of a plasma channel 11 which extends from a position in front of the cathode 5 and further towards and through the anode 7. The inlet end of the plasma channel 11 is the end closest to the cathode 5; the plasma channel extends through the anode 7 where its outlet opening is arranged. A plasma is intended to be heated in the plasma channel 11 so as to finally flow out through the opening of the plasma channel in the anode 7. The intermediate electrodes 9', 9'', 9''' are insulated and spaced from each other by an annular insulator means 13', 13'', 13'''. The shape of the intermediate electrodes 9', 9'', 9''' and the dimensions of the plasma channel 11 can be adjusted to any desired purposes. The number of intermediate electrodes 9', 9'', 9''' can also be optionally varied. The embodiment shown in FIG. 1*a* is provided with three intermediate electrodes 9', 9'', 9'''.

In the embodiment shown in FIG. 1*a*, the cathode 5 is formed as an elongate cylindrical element. Preferably the cathode 5 is made of tungsten with optional additives, such as lanthanum. Such additives can be used, for instance, to lower the temperature occurring at the end of the cathode 5.

Moreover the end 15 of the cathode 5 which is directed to the anode 7 has a tapering end portion. This tapering portion 15 suitably forms a tip positioned at the end of the cathode as shown in FIG. 1*a*. The cathode tip 15 is suitably conical in shape. The cathode tip 15 can also consist of a part of a cone or have alternative shapes with a tapering geometry towards the anode 7.

The other end of the cathode 5 which is directed away from the anode 7 is connected to an electrical conductor to be connected to an electric energy source. The conductor is suitably surrounded by an insulator. (The conductor is not shown in FIG. 1*a*.)

Connected to the inlet end of the plasma channel 11, a plasma chamber 17 is arranged, which has a cross-sectional surface, transversely to the longitudinal direction of the plasma channel 11, which exceeds the cross-sectional surface of the plasma channel 11 at the inlet end thereof. The plasma chamber 17 which is shown in FIG. 1*a* is circular in cross-section, transversely to the longitudinal direction of the plasma channel 11, and has an extent $L_{ch}$ in the longitudinal direction of the plasma channel 11 which corresponds approximately to the diameter $D_{ch}$ of the plasma chamber 17. The plasma chamber 17 and the plasma channel 11 are substantially concentrically arranged relative to each other. The cathode 5 extends into the plasma chamber 17 at least half the length $L_{ch}$ thereof and the cathode 5 is arranged substantially concentrically with the plasma chamber 17. The plasma chamber 17 consists of a recess formed by the first intermediate electrode 9' which is positioned next to the cathode 5.

FIG. 1*a* also shows an insulator element 19 which extends along and around parts of the cathode 5. The insulator element 19 is suitably formed as an elongate cylindrical sleeve and the cathode 5 is partly positioned in a circular hole extending through the tubular insulator element 19. The cathode 5 is substantially centred in the through hole of the insulator element 19. Moreover the inner diameter of the insulator element 19 slightly exceeds the outer diameter of the cathode 5, thereby forming a distance between the outer circumferential surface of the cathode 5 and the inner surface of the circular hole of the insulator element 19.

Preferably the insulator element 19 is made of a temperature-resistant material, such as ceramic material, temperature-resistant plastic material or the like. The insulator element 19 intends to protect adjoining parts of the plasma-generating device from high temperatures which can occur, for instance, around the cathode 5, in particular around the tip 15 of the cathode.

The insulator element 19 and the cathode 5 are arranged relative to each other so that the end 15 of the cathode 5 which is directed to the anode projects beyond an end face 21, which is directed to the anode 7, of the insulator element 19. In the embodiment shown in FIG. 1*a*, approximately half the tapering tip 15 of the cathode 5 projects beyond the end face 21 of the insulator element 19.

A gas supply part (not shown in FIG. 1*a*) is connected to the plasma-generating part. The gas supplied to the plasma-generating device 1 advantageously consists of the same type of gases that are used as plasma-generating gas in prior art instruments, for instance inert gases, such as argon, neon, xenon, helium etc. The plasma-generating gas is allowed to flow through the gas supply part and into the space arranged between the cathode 5 and the insulator element 19. Consequently the plasma-generating gas flows along the cathode 5 inside the insulator element 19 towards the anode 7. As the plasma-generating gas passes the end 21 of the insulator element 19, the gas is passed on to the plasma chamber 17.

The plasma-generating device 1 further comprises one or more coolant channels 23 which open into the elongate end sleeve 3. The coolant channels 23 are suitably partly made in one piece with a housing (not shown) which is connected to the end sleeve 3. The end sleeve 3 and the housing can, for instance, be interconnected by a threaded joint, but also other connecting methods, such as welding, soldering etc, are conceivable. Moreover the end sleeve suitably has an outer dimension which is less than 10 mm, preferably less than 5 mm, in particular between 3 mm and 5 mm. At least a housing portion positioned next to the end sleeve suitably has an outer shape and dimension which substantially corresponds to the outer dimension of the end sleeve. In the embodiment of the plasma-generating device shown in FIG. 1*a*, the end sleeve is circular in cross-section transversely to its longitudinal direction.

The coolant channels 23 suitably consist of through-flow channels which extend through the device and open into or in the vicinity of the anode 7. Moreover parts of such coolant channels 23 can be made, for instance, by extrusion of the housing or mechanical working of the housing. However, it will be appreciated that parts of the coolant channel 23 can also be formed by one or more parts which are separate from the housing and arranged inside the housing.

The plasma-generating device 1 can be provided with a coolant channel 23 which is provided with one or more outlet openings 25. Alternatively, the plasma-generating device 1 can be provided with a plurality of coolant channels 23, which each can be provided with one or more outlet openings 25. Each coolant channel 23 can also be divided into a plurality of channel portions which are combined in a common channel portion, which common channel portion can be provided with one or more outlet openings 25. It is also possible to use all or some of the channels 23 for other purposes. For example, three channels 23 can be arranged, two being used to be passed by coolant and one to suck liquids, or the like, from a surgical area etc.

In the embodiment shown in FIG. 1*a*, a part of the coolant channel 23 extends through the end sleeve 3 and around the intermediate electrodes 9', 9'', 9'''. The coolant channel 23 according to FIG. 1*a* is provided with a plurality of outlet openings 25.

Moreover the outlet openings 25 of the coolant channel 23 are arranged beyond, in the direction from the cathode 5 to the anode 7, the intermediate electrodes 9', 9'', 9'''. In the embodiment shown in FIG. 1*a*, the coolant channel 23 extends through the end sleeve 3 and the anode 7. Moreover the channel direction of the coolant channel 23 at the outlet openings 25 has a directional component which is the same as that of the channel direction of the plasma channel 11 at the opening thereof. According to FIG. 1*a*, two such outlet openings 25 are shown. Preferably the plasma-generating device 1 is provided with four or more outlet openings 25.

Coolant channels 23 can partly be used to cool the plasma-generating device 1 in operation. As coolant, use is preferably made of water, although other types of fluids are conceivable. To provide cooling, a portion of the coolant channel 23 is arranged so that the coolant is supplied to the end sleeve 3 and flows between the intermediate electrodes 9', 9'', 9''' and the inner wall of the end sleeve 3. In operation of the device, it is preferred to let a flow amount of 1-5 ml/s flow through the plasma-generating device 1. The flow amount of coolant may, however, be optionally varied depending on factors such as operating temperature, desired operating properties, field of application etc. In surgical applications, the coolant flow rate is typically between 1 and 3 ml/s and the temperature of the coolant flowing out through the outlet opening 25 is typically between 25 and 40° C.

The coolant which is intended to flow through the coolant channels 25 can also be used to screen the plasma jet and restrict the range of the plasma jet which is emitted through the outlet of the plasma channel 11 in the anode 7. The coolant can also be used to cool areas adjacent to a region, affected by the plasma jet, of an object.

In the embodiment shown in FIG. 1*a*, the channel direction of the coolant channel 23 at the outlet openings 25 is directed at an angle α towards the centre of the longitudinal direction of the plasma channel 11.

The directed outlet portions allow that the plasma jet generated in operation can be screened in its longitudinal direction by the coolant flowing through the outlet openings 25 of the coolant channel 23. As a result, an operator who operates the device can obtain an essentially distinct position where the plasma jet will be active. In front of this position, suitably little effect from the plasma jet occurs. Consequently this enables good accuracy, for instance, in surgery and other precision-requiring fields of application. At the same time the coolant discharged through the outlet opening 25 of a coolant channel 23 can provide a screening effect in the lateral direction radially outside the centre of the plasma jet. Owing to such screening, a limited surface can be affected by heat locally, and cooled areas of the treated object, outside the area affected by the heat of the plasma, are affected to a relatively small extent by the plasma jet.

Figure 2A:
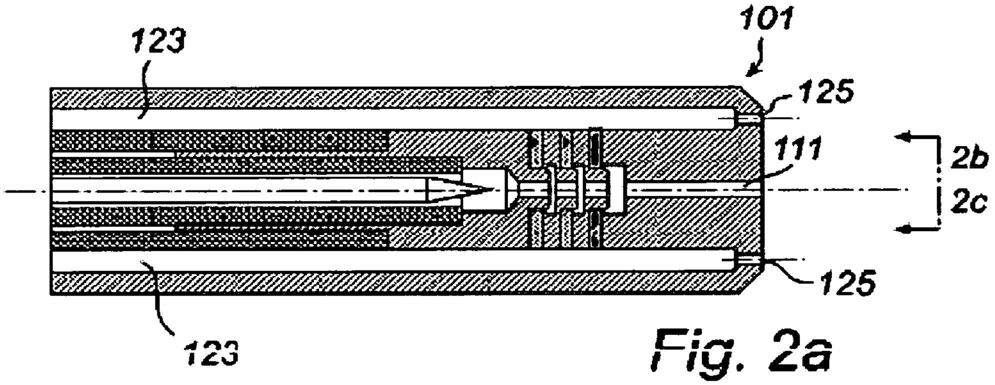
FIG. 2*a* is a cross-sectional view of an alternative embodiment of the plasma-generating device.
Figure 2B:
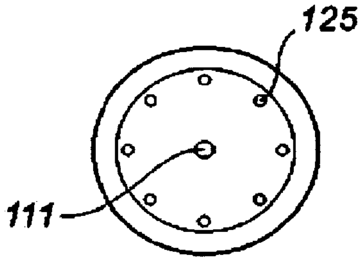
FIG. 2*b* is a front plan view of the plasma-generating device according to FIG. 2*a;*
Figure 2C:
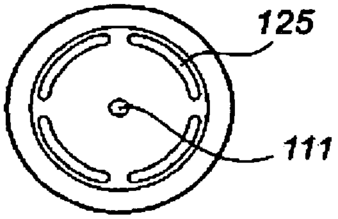
FIG. 2*c* is a front plan view of an alternative embodiment of the plasma-generating device according to FIG. 2*a*.
Figure 3:
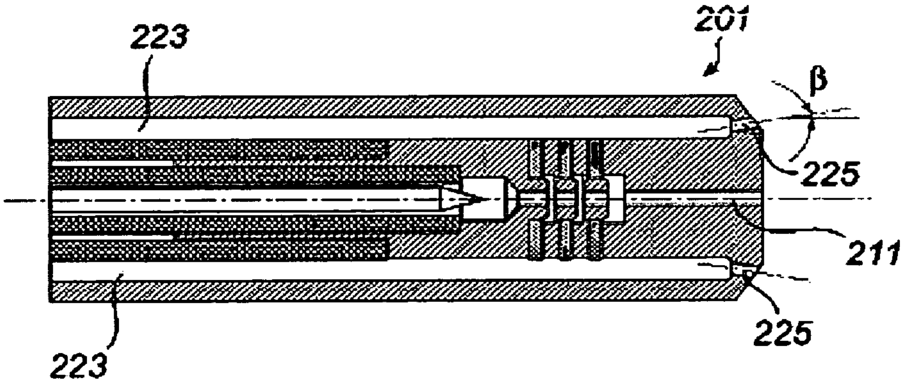
FIG. 3 is a cross-sectional view of another alternative embodiment of a plasma-generating device.

FIGS. 2*a*-3 illustrate alternative embodiments of a plasma-generating device 1. Important differences between these embodiments and the embodiment according to FIG. 1*a* will be described below.

In the embodiment shown in FIG. 2*a*, the channel direction of the coolant channel 123 at the outlet openings 125 is arranged substantially parallel to the longitudinal direction of the plasma channel 111. In this case, mainly screening of the plasma jet in the radial direction relative to the centre line of the plasma channel 111 is obtained.

FIG. 3 shows another alternative embodiment of a plasma-generating device 201. In the embodiment shown in FIG. 3, the channel direction of the coolant channel 223 at the outlet openings 225 is directed at an angle β away from the centre of the longitudinal direction of the plasma channel 211. This results in screening which increases in distance, relative to the centre line of the plasma channel 211, with an increased distance from the anode 207 and, thus, the outlet of the plasma channel 211.

It will be appreciated that the embodiments according to FIGS. 1-3 can be combined to form additional embodiments. For example, different outlets can be directed and angled differently in relation to the longitudinal direction of the plasma channel 23; 123; 223. For example, it is possible to provide a plasma-generating device 1; 101; 201 with two outlet portions which are directed parallel to the plasma channel 11; 111; 211 and two outlet portions which are directed inwards to the centre of the longitudinal direction of the plasma channel 11; 111; 211. The variations, with regard to angle and direction of the channel direction of the coolant channel 23; 123; 223 at the outlet openings 25; 125; 225, can be optionally combined depending on the desired properties of the plasma-generating device 1; 101; 201.

It is also possible to vary the angle of the channel direction at the outlet portions 25; 125; 225 in relation to the longitudinal direction of the plasma channel 11; 111; 211.

Preferably, the outlet portions are arranged at an angle α, β of ±30 degrees in relation to the longitudinal direction of the plasma channel 11; 111; 211. In the embodiment shown in FIG. 1*a* the outlet portions are arranged at an angle α of +10 degrees in relation to the longitudinal direction of the plasma channel 11; 111; 211. For the plasma-generating device shown in FIG. 1*a*, an angle α of 10° means that coolant flowing out through the opening of the coolant channel will intersect the centre of the longitudinal direction of the plasma channel about 8-10 mm in front of the outlet of the plasma channel in the anode.

In the embodiment shown in FIG. 3, the outlet portions are arranged at an angle β of −10 degrees in relation to the longitudinal direction of the plasma channel 11; 111; 211.

FIGS. 2*b*-2*c* are front views of different embodiments of the plasma-generating device 101 in FIG. 2*a*. FIG. 2*b* shows a design where the outlet openings 125 of the outlet portions are positioned beside and spaced from the outlet of the plasma channel 111 in the anode. In the embodiment shown in FIG. 2*b*, the outlet openings 125 are formed as eight circular lead-ins which communicate with the coolant channel 123. It is possible to optionally arrange more or fewer than eight circular lead-ins depending on desirable properties and performance of the plasma-generating device 101. It is also possible to vary the size of the circular lead-ins.

FIG. 2*c* shows an alternative design of the outlet openings 125 of the coolant channel 123. FIG. 2*c* is a front view of the plasma-generating device 101 in FIG. 2*a*. In the embodiment shown in FIG. 2*c*, the outlet openings 125 are formed as four arched lead-ins which communicate with the coolant channel.

It will be appreciated that the outlet openings 125 of the cooling channel 123 optionally can be designed with a number of alternative geometries and sizes. The cross-sectional surface of the outlet openings can typically be between 0.50 and 2.0 $mm^2$, preferably 1 to 1.5 $mm^2$.

Figure 1B:
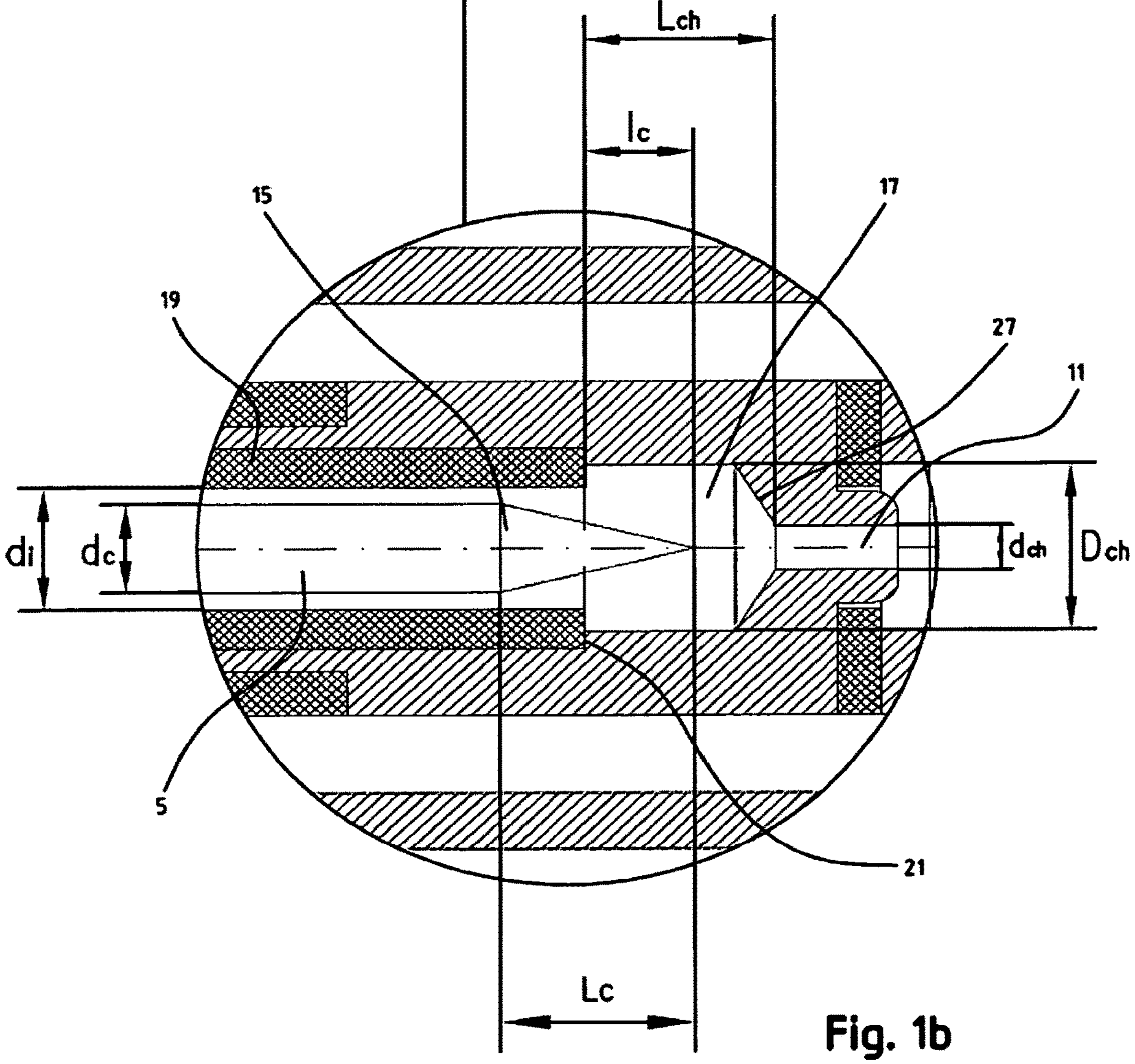
FIG. 1*b* is a partial enlargement of the embodiment according to FIG. 1*a;*

It is obvious that these different designs of the outlet openings 25; 125; 225 can also be used for the embodiments of the plasma-generating device as shown in FIGS. 1*a*-*b* and 3.

The following description refers to FIGS. 1*a*-*b*. The conditions and dimensions stated are, however, also relevant as exemplary embodiments of the embodiments of the plasma-generating device shown in FIGS. 2*a*-3.

The intermediate electrodes 9', 9'', 9''' shown in FIG. 1*a* are arranged inside the end sleeve 3 of the plasma-generating device 1 and are positioned substantially concentrically with the end sleeve 3. The intermediate electrodes 9', 9'', 9''' have an outer diameter which in relation to the inner diameter of the end sleeve 3 forms an interspace between the outer surface of the intermediate electrodes 9', 9'', 9''' and the inner wall of the end sleeve 3. It is in this space between the intermediate electrodes 9', 9'', 9''' and the end sleeve 3 where the coolant flows to be discharged through the outlet openings 125 of the coolant channel 23.

In the embodiment shown in FIG. 1*a*, three intermediate electrodes 9', 9'', 9''', spaced by insulator means 13', 13'', 13''', are arranged between the cathode 5 and the anode 7. The first intermediate electrode 9', the first insulating 13' and the second intermediate electrode 9'' are suitably press-fitted to each other. Similarly, the second intermediate electrode 9'', the second insulator 13'' and the third intermediate electrode 9''' are suitably press-fitted to each other. However, it will be appreciated that the number of intermediate electrodes 9', 9'', 9''' can be optionally selected depending on the desired purpose.

The intermediate electrode 9''' which is positioned furthest away from the cathode 5 is in contact with an annular insulator means 13''' which is arranged against the anode 7.

The anode 7 is connected to the elongate end sleeve 3. In the embodiment shown in FIG. 1*a*, the anode 7 and the end sleeve 3 are integrally formed with each other. In alternative embodiments, the anode 7 can be designed as a separate element which is joined to the end sleeve 3 by a threaded joint between the anode and the end sleeve, by welding or by soldering. The connection between the anode 7 and the end sleeve 3 is suitably such as to provide electrical contact between the two.

Suitable geometric relationships between parts included in the plasma-generating device 1, 101, 201 will be described below with reference to FIGS. 1*a*-*b*. It should be noted that the dimensions stated below merely constitute exemplary embodiments of the plasma-generating device 1, 101, 201 and can be varied depending on the field of application and the desired properties. It should also be noted that the examples described in FIGS. 1*a*-*b* can also be applied to the embodiments in FIGS. 2*a*-3.

The inner diameter $d_i$ of the insulator element 19 is only slightly greater than the outer diameter $d_c$ of the cathode 5. In one embodiment, the difference in cross-section, in a common cross-section, between the cathode 5 and the inner diameter $d_i$ of the insulator element 19 is suitably equal to or greater than a minimum cross-section of the plasma channel 11. Such a cross-section of the plasma channel 11 can be positioned anywhere along the extent of the plasma channel 11.

In the embodiment shown in FIG. 1*b*, the outer diameter $d_c$ of the cathode 5 is about 0.50 mm and the inner diameter $d_i$ of the insulator element about 0.80 mm.

In one embodiment, the cathode 5 is arranged so that a partial length of the cathode tip 15 projects beyond a boundary surface 21 of the insulator element 19. The tip 15 of the cathode 5 is in FIG. 1*b* positioned so that about half the length $L_c$ of the tip 15 projects beyond the boundary surface 21 of the insulator element 19. In the embodiment shown in FIG. 1*b*, this projection $l_c$ corresponds to approximately the diameter $d_c$ of the cathode 5.

The total length $L_c$ of the cathode tip 15 is suitably greater than 1.5 times the diameter $d_c$ of the cathode 5 at the base of the cathode tip 15. Preferably the total length $L_c$ of the cathode tip 15 is about 1.5-3 times the diameter $d_c$ of the cathode 5 at the base of the cathode tip 15. In the embodiment shown in FIG. 1*b*, the length $L_c$ of the cathode tip 15 corresponds to about 2 times the diameter $d_c$ of the cathode 5 at the base of the cathode tip 15.

In one embodiment, the diameter $d_c$ of the cathode 5 is about 0.3-0.6 mm at the base of the cathode tip 15. In the embodiment shown in FIG. 1*b*, the diameter $d_c$ of the cathode 5 is about 0.50 mm at the base of the cathode tip 15. Preferably the cathode has a substantially identical diameter $d_c$ between the base of the cathode tip 15 and the end of the cathode 5 opposite the cathode tip 15.

However, it will be appreciated that it is possible to vary this diameter $d_c$ along the extent of the cathode 5. In one embodiment, the plasma chamber 17 has a diameter $D_c$ which corresponds to approximately 2-2.5 times the diameter $d_c$ of the cathode 5 at the base of the cathode tip 15. In the embodiment shown in FIG. 1*b*, the plasma chamber 17 has a diameter $D_{ch}$ which corresponds to approximately 2 times the diameter $d_c$ of the cathode 5.

The extent $L_{ch}$ of the plasma chamber 17 in the longitudinal direction of the plasma-generating device 1 corresponds to approximately 2-2.5 times the diameter $d_c$ of the cathode 5 at the base of the cathode tip 15. In the embodiment shown in FIG. 1*b*, the length $L_{ch}$ of the plasma chamber 17 corresponds to approximately the diameter $D_{ch}$ of the plasma chamber 17.

In one embodiment the tip 15 of the cathode 5 extends over half the length $L_{ch}$ of the plasma chamber 17 or more than said length. In an alternative embodiment, the tip 15 of the cathode 5 extends over ½ to ⅔ of the length $L_{ch}$ of the plasma chamber 17. In the embodiment shown in FIG. 1*b*, the cathode tip 15 extends approximately over half the length $L_{ch}$ of the plasma chamber 17.

In the embodiment shown in FIG. 1*b*, the cathode 5 extending into the plasma chamber 17 is positioned at a distance from the end of the plasma chamber 17 closest to the anode 7 which corresponds to approximately the diameter $d_c$ of the cathode 5 at the base thereof.

In the embodiment shown in FIG. 1*b*, the plasma chamber 17 is in fluid communication with the plasma channel 11. The plasma channel 11 suitably has a diameter $d_{ch}$ which is about 0.2-0.5 mm. In the embodiment shown in FIG. 1*b*, the diameter $d_{ch}$ of the plasma channel 11 is about 0.40 mm. However, it will be appreciated that the diameter $d_{ch}$ of the plasma channel 11 can be varied in different ways along the extent of the plasma channel 11 to provide different desirable properties.

A transition portion 27 is arranged between the plasma chamber 17 and the plasma channel 11 and constitutes a tapering transition, in the direction from the cathode 5 to the anode 7, between the diameter $D_{ch}$ of the plasma chamber 17 and the diameter $d_{ch}$ of the plasma channel 11. The transition portion 27 can be formed in a number of alternative ways. In the embodiment shown in FIG. 1*b*, the transition portion 27 is formed as a bevelled edge which forms a transition between the inner diameter $D_{ch}$ of the plasma chamber 17 and the inner diameter $d_{ch}$ of the plasma channel 11. However, it should be noted that the plasma chamber 17 and the plasma channel 11 can be arranged in direct contact with each other without a transition portion 27 arranged between the two. The use of a transition portion 27 as shown in FIG. 1*b* allows advantageous heat extraction to cool structures adjacent to the plasma chamber 17 and the plasma channel 11.

The plasma channel 11 is formed by the anode 7 and the intermediate electrodes 9', 9'', 9''' arranged between the cathode 5 and the anode 7. The length of the plasma channel 11 between the opening of the plasma channel closest to the cathode and up to the anode corresponds suitably to about 4-10 times the diameter $d_{ch}$ of the plasma channel 11. In the embodiment shown in FIG. 1*a*, the length of the plasma channel 11 between the opening of the plasma channel closest to the cathode and the anode is about 1.6 mm.

That part of the plasma channel which extends through the anode is about 3-4 times the diameter do of the plasma channel 11. For the embodiment shown in FIG. 1*a*, that part of the plasma channel which extends through the anode has a length of about 2 mm.

The plasma-generating device 1 can advantageously be provided as a part of a disposable instrument. For example, a complete device with the plasma-generating device 1, outer shell, tubes, coupling terminals etc. can be sold as a disposable instrument. Alternatively, only the plasma-generating device 1 can be disposable and connected to multiple-use devices.

Other embodiments and variants are conceivable within the scope of the present invention. For example, the number and shape of the electrodes 9', 9'', 9''' can be varied according to which type of plasma-generating gas is used and which properties of the generated plasma are desired.

In use the plasma-generating gas, such as argon, which is supplied through the gas supply part, is introduced into the space between the cathode 5 and the insulator element 19 as described above. The supplied plasma-generating gas is passed on through the plasma chamber 17 and the plasma channel 11 to be discharged through the opening of the plasma channel 11 in the anode 7. Having established the gas supply, a voltage system is switched on, which initiates a discharge process in the plasma channel 11 and establishes an electric arc between the cathode 5 and the anode 7. Before establishing the electric arc, it is suitable to supply coolant to the plasma-generating device 1 through the coolant channel 23, as described above. Having established the electric arc, a gas plasma is generated in the plasma chamber 17, which during heating is passed on through the plasma channel 11 to the opening thereof in the anode 7.

A suitable operating current for the plasma-generating devices 1, 101, 201 according to FIGS. 1-3 is 4-10 ampere, preferably 4-6 ampere. The operating voltage of the plasma-generating device 1, 101, 201 is, inter alia, dependent on the number of intermediate electrodes and the length thereof. A relatively small diameter of the plasma channel allows relatively low consumption of energy and relatively low operating current in use of the plasma-generating device 1, 101, 201.

In the electric arc established between the cathode and anode, there prevails in the centre thereof, along the centre axis of the plasma channel, a temperature T which is proportional to the relationship between the discharge current I and the diameter $d_{ch}$ of the plasma channel ($T=k*i/d_{ch}$). To provide, at a relatively low current level, a high temperature of the plasma, for instance 10,000 to 15,000° C., at the outlet of the plasma channel in the anode, the cross-section of the plasma channel and, thus, the cross-section of the electric arc which heats the gas should be small, for instance 0.2-0.5 mm. With a small cross-section of the electric arc, the electric field strength in the channel has a high value.

What is claimed:

1. A plasma-generating device, comprising:

a plasma chamber;

an anode;

a cathode having a tapering tip, the tapering tip having a first portion disposed proximal to the plasma chamber and a second portion extending into the plasma chamber and terminating proximal of the anode, the anode and the cathode configured to establish an electric arc with a current of about 4-10 A to generate plasma having a temperature of at least 10,000° C.;

a plasma outlet configured to discharge the plasma as a charged plasma jet out of the plasma-generating device at a temperature of at least 10,000° C.; and a coolant channel configured to receive a coolant such that the coolant flowing through the coolant channel cools a portion of the plasma-generating device adjacent to the cooling channel.

2. The plasma-generating device of claim 1, wherein the coolant channel includes a coolant outlet configured to discharge the coolant.

3. The plasma-generating device of claim 2, wherein the coolant outlet is arranged around the plasma outlet such that the coolant discharged through the coolant outlet restricts a flow of the plasma discharged from the plasma outlet.

4. The plasma-generating device of claim 2, wherein the coolant channel is configured to discharge the coolant through the coolant outlet at a rate of between 1 and 5 ml/s.

5. The plasma-generating device of claim 1, further comprising:

a plasma channel extending longitudinally from the plasma chamber to the plasma outlet, the plasma channel and the plasma outlet defining a discharge path for the plasma.

6. The plasma-generating device of claim 5, wherein the coolant channel is parallel to the plasma channel.

7. The plasma-generating device of claim 5, wherein the tapering tip of the cathode is disposed a non-zero distance away from an inlet of the plasma channel.

8. The plasma-generating device of claim 5, wherein the plasma channel is configured to discharge a plasma jet through the plasma outlet, and the coolant channel includes a coolant outlet configured to discharge the coolant to restrict the plasma jet.

9. A plasma-generating device, comprising:

an anode;

a cathode having a tapering tip, the tapering tip narrowing toward the anode and terminating proximal of the anode, the anode and the cathode configured to establish an electric arc with a current of about 4-10 A to generate charged plasma having a temperature of at least 10,000° C.;

a sleeve having a portion that surrounds a portion of the tapering tip, the portion of the sleeve having a constant inner diameter such that a space between an inner surface of the sleeve and the cathode increases along a length of the tapering tip in a distal direction;

an outlet disposed at an end of the sleeve and being configured to discharge the charged plasma as a charged plasma jet out of the plasma-generating device at a temperature of at least 10,000° C., the charged plasma jet configured to treat biological tissue; and a coolant channel configured to receive a coolant such that the coolant flowing through the coolant channel cools a portion of the plasma-generating device adjacent to the cooling channel.

10. The plasma-generating device of claim 9, wherein the coolant channel includes a coolant outlet that is disposed in the anode.

11. The plasma-generating device of claim 10, wherein the coolant outlet is arranged around a plasma outlet such that the coolant discharged through the coolant outlet restricts a flow of the plasma discharged from the plasma outlet.

12. The plasma-generating device of claim 10, wherein the coolant channel is configured to discharge the coolant through the coolant outlet at a rate of between 1 and 5 ml/s.

13. A plasma-generating device, comprising:

an insulator sleeve having a distal end;

an anode;

a cathode having a tapered portion, the tapered portion having a first portion disposed within the insulator sleeve and a second portion projecting beyond the insulator sleeve and terminating proximal of the anode, the anode and the cathode configured to establish an electric arc with a current of about 4-10 A to generate plasma having a temperature of at least 10,000° C.;

a plasma channel extending longitudinally from the cathode and having an outlet at an end of the plasma channel, the outlet configured to discharge the plasma as a charged plasma jet out of the plasma-generating device at a temperature of at least 10,000° C. to treat biological tissue; and a coolant channel configured to receive a coolant such that the coolant flowing through the coolant channel cools a portion of the plasma-generating device adjacent to the cooling channel.

14. The plasma-generating device of claim 13, wherein at least a portion of the coolant channel is parallel to the plasma channel.

15. The plasma-generating device of claim 13, wherein the coolant channel includes a coolant outlet configured to discharge the coolant.

16. The plasma-generating device of claim 15, wherein an angle between a direction of the coolant channel at the outlet and a direction of the plasma channel is between +30 and −30 degrees.

17. The plasma-generating device of claim 16, wherein the angle is zero.

18. The plasma-generating device of claim 15, wherein the outlet of the coolant channel angles toward the outlet of the plasma channel.

19. The plasma-generating device of claim 13, wherein the tapered portion of the cathode is disposed a non-zero distance away from an inlet of the plasma channel.

20. The plasma-generating device of claim 1, wherein a distal end of the plasma-generating device has an outer dimension that is equal to or less than 5 mm.

21. The plasma-generating device of claim 1, wherein the outlet of the coolant channel angles away from the outlet of the plasma channel.

22. The plasma-generating device of claim 1, further comprising:

at least one intermediate electrode arranged at least partly between the anode and the cathode.

23. The plasma-generating device of claim 5, wherein the plasma channel is configured to discharge a plasma jet through the plasma outlet to treat biological tissue, and the coolant channel is configured to discharge the coolant through a coolant outlet to cool the biological tissue.

24. The plasma-generating device of claim 5, wherein the plasma channel has a diameter of between 0.2 mm and 0.5 mm.

25. The plasma-generating device of claim 1, wherein the electric arc has a cross-section of between 0.2 mm and 0.5 mm.

* * * * *